(12) United States Patent
Yamazaki et al.

(10) Patent No.: US 10,974,452 B2
(45) Date of Patent: Apr. 13, 2021

(54) MANUFACTURING METHOD FOR THREE-DIMENSIONAL OBJECT

(71) Applicant: MIMAKI ENGINEERING CO., LTD., Nagano (JP)

(72) Inventors: Yasunori Yamazaki, Nagano (JP); Kunio Hakkaku, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 761 days.

(21) Appl. No.: 15/622,050

(22) Filed: Jun. 13, 2017

(65) Prior Publication Data

US 2017/0361532 A1   Dec. 21, 2017

(30) Foreign Application Priority Data

Jun. 20, 2016   (JP) .............................. JP2016-121910

(51) Int. Cl.
   *B29C 64/00*   (2017.01)
   *B33Y 10/00*   (2015.01)
   (Continued)

(52) U.S. Cl.
   CPC .......... *B29C 64/188* (2017.08); *B29C 64/112* (2017.08); *B29C 64/129* (2017.08);
   (Continued)

(58) Field of Classification Search
   CPC ......... B29C 64/00; B29C 64/10; B29C 64/11; B29C 64/112; B29C 64/12; B29C 64/129;
   (Continued)

(56) References Cited

U.S. PATENT DOCUMENTS

| | | | | |
|---|---|---|---|---|
| 2009/0173443 | A1* | 7/2009 | Kozlak | B29C 64/135 |
| | | | | 156/303.1 |
| 2014/0333012 | A1* | 11/2014 | Riepenhoff | H04R 25/658 |
| | | | | 264/401 |

FOREIGN PATENT DOCUMENTS

| | | |
|---|---|---|
| JP | H04366617 | 12/1992 |
| JP | 2000190086 | 7/2000 |

(Continued)

OTHER PUBLICATIONS

"Office Action of Japan Counterpart Application", dated Feb. 26, 2019, with English translation thereof, p. 1-p. 7.

*Primary Examiner* — Jacob T Minskey
*Assistant Examiner* — Matthew Hoover
(74) *Attorney, Agent, or Firm* — JCIPRNET

(57) ABSTRACT

To more efficiently manufacture a three-dimensional object shaped by layering a shaping material with a three-dimensional printer. A manufacturing method for a three-dimensional object according to an embodiment includes: a first shaping process (step S12) of layering a shaping material with a three-dimensional object shaping device (three-dimensional printer) to shape a first shaping portion including a recess opened in a layering direction of the shaping material; a closing process (step S15) of closing an open end of the recess of the first shaping portion; and a second shaping process (step S16) of layering the shaping material with the three-dimensional object shaping device (three-dimensional printer) on the first shaping portion, which open end of the recess is closed, to shape a second shaping portion.

13 Claims, 16 Drawing Sheets

(51) Int. Cl.
*B33Y 50/00*    (2015.01)
*B29C 64/188*   (2017.01)
*B29C 64/112*   (2017.01)
*B33Y 50/02*    (2015.01)
*B29C 64/129*   (2017.01)
*B22F 5/10*     (2006.01)
*B22F 7/08*     (2006.01)
*B22F 10/00*    (2021.01)
*B29C 35/08*    (2006.01)

(52) U.S. Cl.
CPC ............... *B33Y 10/00* (2014.12); *B33Y 50/02* (2014.12); *B22F 5/10* (2013.01); *B22F 7/08* (2013.01); *B22F 10/00* (2021.01); *B29C 2035/0827* (2013.01)

(58) Field of Classification Search
CPC ....... B29C 64/18; B29C 64/188; B33Y 10/00; B33Y 50/00; B33Y 50/02
See application file for complete search history.

(56) References Cited

FOREIGN PATENT DOCUMENTS

| | | | | |
|---|---|---|---|---|
| JP | 2000190086 A | * | 7/2000 | ............. B33Y 10/00 |
| JP | 2011256434 | | 12/2011 | |
| JP | 2014021174 | | 2/2014 | |
| WO | 2015136982 | | 9/2015 | |

* cited by examiner

MANUFACTURING METHOD FOR THREE-DIMENSIONAL OBJECT

CROSS REFERENCE TO RELATED APPLICATIONS

This application claims the priority benefit of Japanese Patent Application No. 2016-121910, filed on Jun. 20, 2016. The entirety of the above-mentioned patent application is hereby incorporated by reference herein and made a part of this specification.

TECHNICAL FIELD

The present disclosure relates to a manufacturing method for a three-dimensional object.

DESCRIPTION OF THE BACKGROUND ART

Conventionally, a technique for forming a cavity inside a three-dimensional object for various purposes including, for example, disposing an incorporated object, reducing weight and material cost, and reproducing a tentacle feeling of a model in the three-dimensional object shaped by layering a shaping material with a three-dimensional printer is known. For example, Japanese Laid-Open Patent Publication No. 2014-21174 (Ref. 1) discloses a manufacturing method for an organ model of sequentially layering a light curable shaping resin and a support resin with a three-dimensional printer based on photograph data of an artificial organ to form an outer shape body, and removing the support resin from the outer shape body to form a mold (shell body mold) of an organ model interiorly including a cavity portion.

SUMMARY

However, in the method disclosed in Ref 1, a process of removing the support material from the outer shape body, a process of forming a hole for removing the support material in the outer shape body, and the like are required to provide an interior cavity in the three-dimensional object, and hence the three-dimensional object becomes difficult to manufacture efficiently.

In light of the foregoing, the present disclosure provides a manufacturing method for a three-dimensional object that can more efficiently manufacture a three-dimensional object shaped by layering a shaping material with a three-dimensional printer.

In order to solve the problem and to achieve the above, a manufacturing method for a three-dimensional object according to the present disclosure includes a first shaping process of layering a shaping material with a three-dimensional printer to shape a first shaping portion including a recess opened in a layering direction of the shaping material; a closing process of closing an open end of the recess of the first shaping portion; and a second shaping process of layering the shaping material with the three-dimensional printer on the first shaping portion, which open end of the recess is closed, to form a second shaping portion.

In the manufacturing method for a three-dimensional object, by providing a recess opened in a layering direction of a shaping material in a first shaping portion shaped by layering the shaping material with a three-dimensional printer, and closing an open end of the recess with a closing member, the shaping material can again be layered with the three-dimensional printer on the first shaping portion to shape a second shaping portion. As a result, the recess whose open end is closed by the closing member can become an internal cavity of the three-dimensional object. Thus, the internal cavity can be provided in the three-dimensional object without removing the support material from the interior of the three-dimensional object or providing a hole for removing the support material in the three-dimensional object. Therefore, according to the manufacturing method for a three-dimensional object of the present disclosure, a three-dimensional object shaped by layering a shaping material with a three-dimensional printer can be more efficiently manufactured.

The portion closing the open end of the recess is preferably extended flatly with a portion other than the recess at an uppermost part of the first shaping portion. Thus, the second shaping portion can be easily shaped with the three-dimensional printer on the first shaping portion, which open end of the recess is closed.

The closing process preferably includes a process of placing a lid member for closing the open end of the recess on the first shaping portion. Thus, the open end of the recess can be easily closed by simply placing the lid member on the first shaping portion, and hence the three-dimensional object can be more efficiently manufactured.

The first shaping process preferably includes a process of forming a step, on which the lid member can be placed, at an edge of the open end of the recess. Thus, the lid member can be easily and stably placed on the first shaping portion, and hence the three-dimensional object can be more efficiently manufactured.

The method further includes an incorporated object disposing process of disposing an incorporated object in the recess of the first shaping portion, where the incorporated object disposing process is preferably carried out between the first shaping process and the closing process. Thus, the incorporated object can be easily disposed in the three-dimensional object, and hence the three-dimensional object including the incorporated object can be more efficiently manufactured.

The method further includes a shock absorbing material disposing process of disposing a shock absorbing material at a periphery of the incorporated object in the recess, where the shock absorbing material disposing process is preferably carried out between the incorporated object disposing process and the closing process. Thus, movement of the incorporated object can be suppressed inside the three-dimensional object, so that breakage and sound generation that occur when the incorporated object impacts the inner wall of the three-dimensional object can be suppressed.

The method further includes an incorporated object disposing process of disposing an incorporated object in the recess of the first shaping portion, where the incorporated object disposing process is preferably carried out between the first shaping process and the closing process; and the closing process preferably includes a process of layering a filling material with the three-dimensional printer in the recess where the incorporated object is disposed to close the open end of the recess. Thus, the shaping material can again be layered with the three-dimensional printer on the first shaping portion, which open end of the recess is closed by layering the filling material, to shape the second shaping portion. When forming the recess in the first shaping portion assuming that the incorporated object will be disposed inside the three-dimensional object, the filling material in the recess does not need to be removed as long as the incorporated object can be disposed. As a result, the three-dimensional object can be more efficiently manufactured.

The lid member is preferably an electronic substrate; and the electronic substrate preferably includes at least one of an input unit to which data is input, a storage unit that stores the data input to the input unit, and an output unit from which the data stored in the storage unit is output. Thus, a storage function of the data can be provided to the three-dimensional object, and a unique function can be provided to the three-dimensional object by using the data in various methods by the input unit and the output unit.

The method further includes an incorporated object disposing process of disposing an incorporated object in the recess of the first shaping portion, where the incorporated object disposing process is preferably carried out between the first shaping process and the closing process; and the incorporated object is preferably any one of the storage unit, the input unit, and the output unit. Thus, a unique function can be easily provided to the three-dimensional object incorporating any one of the storage unit, the input unit, and the output unit.

Preferably, the data includes sound data; the input unit is a microphone; and the output unit is a speaker. Thus, the three-dimensional object serving as the recording/reproducing device of the sound data can be easily manufactured.

Preferably, the data includes image data; the input unit is an imaging element; and the output unit is a display. Thus, the three-dimensional object serving as the recording/reproducing device of the image data can be easily manufactured.

Preferably, the data is document data; and the input unit and the output unit are an arithmetic processing device capable of browsing and editing the document data. Thus, the three-dimensional object capable of storing the document data, and capable of browsing and editing the document data with the arithmetic processing device can be easily manufactured.

The electronic substrate preferably has a component arranged on a surface on the recess side. Thus, when layering a shaping material on a surface opposite the recess of the electronic substrate, the three-dimensional printer and the component of the electronic substrate can be prevented from coming into contact, so that the shaping layer can be layered on the electronic substrate without any trouble.

The incorporated object is preferably a unique incorporated object associated with the three-dimensional object.

The data is preferably unique data associated with the three-dimensional object.

The manufacturing method for a three-dimensional object according to the present disclosure has an effect of being able to more efficiently manufacture a three-dimensional object shaped by layering a shaping material with a three-dimensional object printer.

DETAILED DESCRIPTION OF EMBODIMENTS

Hereinafter, embodiments of a manufacturing method for a three-dimensional object according to the present disclosure will be described in detail based on the drawings. It should be noted that the present disclosure is not limited by these embodiments. Components in the following embodiments include components that can be replaced by those skilled in the art and are easy, or are substantially the same.

First Embodiment

Figure 1:
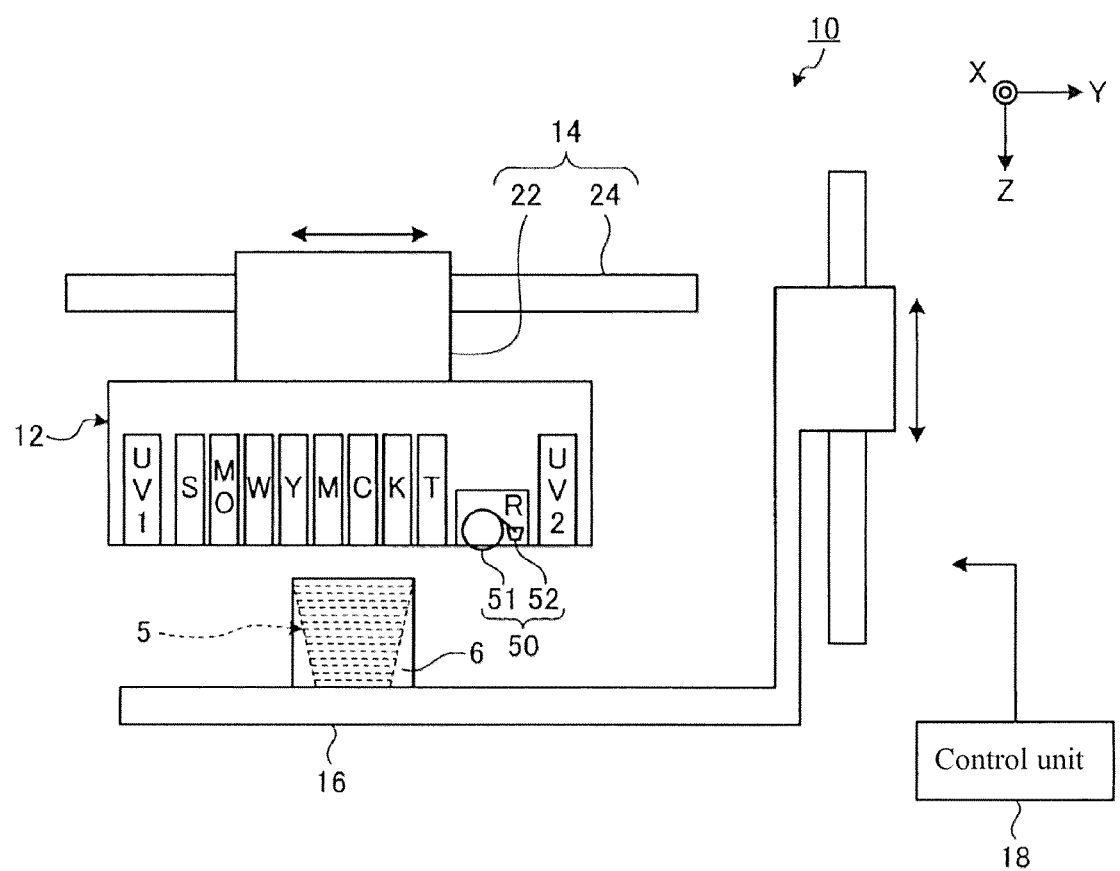
FIG. 1 is a schematic view of a three-dimensional object shaping device used in a manufacturing method for a three-dimensional object according to an embodiment.

FIG. 1 is a schematic view showing a three-dimensional object shaping device 10 used in a manufacturing method for a three-dimensional object according to a first embodiment. The three-dimensional object shaping device 10 shown in FIG. 1 is a three-dimensional printer that shapes a three-dimensional object 5 through a layering shaping method. In this case, the layering shaping method is, for example, a method of shaping the three-dimensional object 5 by overlapping a plurality of layers. The three-dimensional object 5 is, for example, a three-dimensional structural object. The three-dimensional object shaping method executed in the three-dimensional object shaping device 10 may be, for example, a color shaping method of shaping the three-dimensional structural object from shape information and color image information of the three-dimensional structural object.

Other than the points described below, the three-dimensional object shaping device 10 may have a configuration same as or similar to the known three-dimensional object shaping device. Furthermore, the three-dimensional object shaping device 10 may be, for example, a device in which one part of the configuration of an inkjet printer, which is a known print device for a flat surface, is changed. For example, the three-dimensional object shaping device 10 may be a device in which one part of an inkjet printer using an ultraviolet curing type ink (UV ink) is changed.

The three-dimensional object shaping device 10 according to the present embodiment includes a discharging unit 12, a main scanning driving unit 14, a shaping table 16 serving as a placing table for placing the three-dimensional object 5, and a control unit 18. The discharging unit 12 is a portion that discharges a droplet to become a material of the three-dimensional object 5, and discharges the droplet, and the like of a curable resin, which is a resin that cures according to a predetermined condition, and forms each layer configuring the three-dimensional object 5 by curing the droplet. More specifically, for example, the discharging unit 12 repeatedly carries out, over a plurality of times, a layer forming operation of forming a layer of curable resin by discharging the droplet in response to an instruction of the control unit 18, and a curing operation of curing the layer of curable resin formed in the layer forming operation. The discharging unit 12 overlaps and forms a plurality of cured layers of curable resin by repeatedly carrying out such operations.

An ultraviolet curing type resin that cures by irradiation of an ultraviolet ray, for example, is used for the curable resin discharged from the discharging unit 12. In this case, the discharging unit 12 discharges an ink droplet of an ultraviolet curing type ink, for example, as the droplet to become the material of the three-dimensional object 5. In the curing operation, the layer of curable resin is cured by being irradiated with the ultraviolet ray from an ultraviolet light source. In this case, the layer of curable resin refers to the ultraviolet curing type ink.

In the three-dimensional object shaping device 10 according to the present embodiment, the discharging unit 12 discharges an ink droplet of a colored ultraviolet curing type ink to carry out coloring on the surface or the interior of the three-dimensional object 5, thus shaping the colored three-dimensional object 5. The discharging unit 12 also forms a support 6 at a periphery of the three-dimensional object 5, as shown in FIG. 1, at the time of shaping the three-dimensional object 5. The support 6 is a layered structural object (support layer) for supporting the three-dimensional object 5 being shaped, and is dissolved and removed with water, and the like after the shaping of the three-dimensional object 5 is completed.

The main scanning driving unit 14 is a driving unit that causes the discharging unit 12 to carry out a main scanning operation. In the present embodiment, when referring to causing the discharging unit 12 to carry out the main scanning operation, this means, for example, causing an inkjet head of the discharging unit 12 to carry out the main scanning operation. The main scanning operation is, for example, an operation of discharging the ink droplet while moving in a main scanning direction (Y direction in the figure) set in advance.

The main scanning driving unit 14 includes a carriage 22 and a guide rail 24. The carriage 22 is a holding unit that holds the discharging unit 12 while facing the shaping table 16. In other words, the carriage 22 holds the discharging unit 12 such that a discharging direction of the ink droplet discharged from the discharging unit 12 is a direction toward the shaping table 16. The carriage 22 is moved along the guide rail 24 while holding the discharging unit 12 during the main scanning operation. The guide rail 24 is a rail member that guides the movement of the carriage 22, and moves the carriage 22 in response to the instruction of the control unit 18 during the main scanning operation.

The movement of the discharging unit 12 at the time of the main scanning operation may be a relative movement with respect to the three-dimensional object 5. Thus, in an alternative embodiment of the configuration of the three-dimensional object shaping device 10, for example, the three-dimensional object 5 side may be moved by fixing the position of the discharging unit 12 and moving the shaping table 16.

The shaping table 16 is a placing table on which upper surface the three-dimensional object 5 being shaped is placed. The shaping table 16 has a function of moving the upper surface in an up and down direction (Z direction in the figure), and moves the upper surface in accordance with the progress of shaping of the three-dimensional object 5 in response to the instruction of the control unit 18. Thus, a distance (gap) between a surface to be shaped in the three-dimensional object 5 in the middle of shaping and the discharging unit 12 can be appropriately adjusted. The surface to be shaped in the three-dimensional object 5 in this case is the surface on which the next layer by the discharging unit 12 is formed. The scanning in the Z direction of moving the shaping table 16 up and down with respect to the discharging unit 12 may be carried out by moving the discharging unit 12 side in the Z direction.

The control unit 18 is a device that controls each unit of the three-dimensional object shaping device 10, and includes a CPU (Central Processing Unit) functioning as a controller for executing various types of processes, a RAM (Random Access Memory) and a ROM (Read Only Memory) functioning as a memory for storing various types of information, and the like. The control unit 18 controls each unit of the three-dimensional object shaping device 10 based on the shape information, the color image information, and the like of the three-dimensional object 5 to be shaped to carry out the control of the operation for shaping the three-dimensional object 5.

The three-dimensional object shaping device 10 may further include various types of configurations necessary for shaping, coloring, and the like of the three-dimensional object 5. For example, the three-dimensional object shaping device 10 may include a sub-scanning driving unit that causes the discharging unit 12 to carry out a sub-scanning operation, and the like. In this case, the sub-scanning operation is, for example, an operation of relatively moving the inkjet head in the discharging unit 12 in a sub-scanning direction (X direction in the figure) orthogonal to the main scanning direction with respect to the three-dimensional object 5 being shaped. The sub-scanning driving unit causes, for example, the discharging unit 12 to carry out the sub-scanning operation, as necessary, when shaping the three-dimensional object 5 whose length in the sub-scanning direction is longer than a shaping width of the inkjet head in the discharging unit 12, and the like. More specifically, the sub-scanning driving unit may be a driving unit that moves the shaping table 16 in the sub-scanning direction, or may be a driving unit that moves the guide rail 24 in the sub-scanning direction along with the carriage 22 holding the discharging unit 12.

Figure 2:
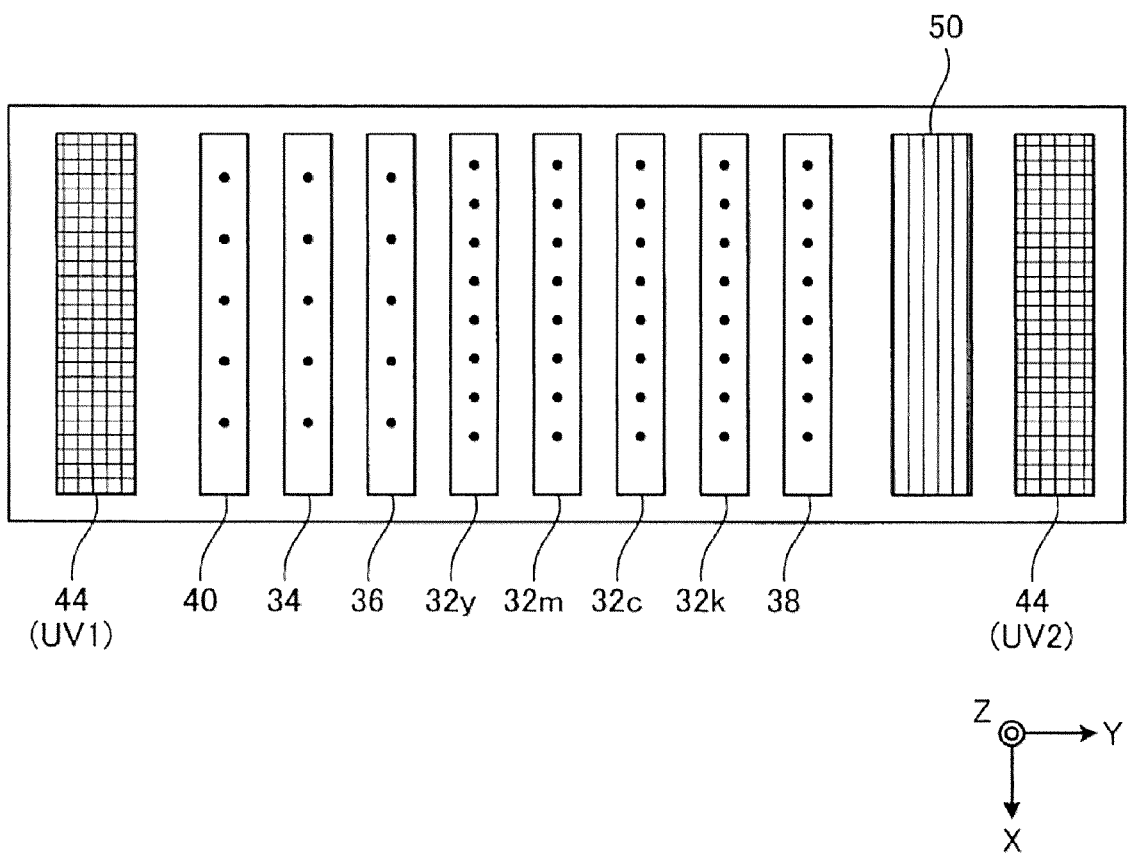
FIG. 2 is an explanatory view of a discharging unit of the three-dimensional object shaping device of FIG. 1 seen from a discharging surface side of an ink droplet.

FIG. 2 is an explanatory view of the discharging unit seen from a discharging surface side of the ink droplet. The discharging unit 12 includes a plurality of colored ink heads 32$y$, 32$m$, 32$c$, 32$k$ (hereinafter referred to as a plurality of colored ink heads 32$y$ to 32$k$), a white ink head 36, a clear ink head 38, a shaping material head 34, a support material head 40, a plurality of ultraviolet light sources 44, and a flattening roller unit 50.

The colored ink heads 32y to 32k, the white ink head 36, the clear ink head 38, and the shaping material head 34 are discharging heads serving as discharging means that discharge the droplet of a curable resin through the inkjet method. Such colored ink heads 32y to 32k, the white ink head 36, the clear ink head 38, and the shaping material head 34 are inkjet heads that discharge the ink droplet of the ultraviolet curing type ink, and are arranged in a line in the main scanning direction (Y direction) with the positions in the sub-scanning direction (X direction) aligned.

The colored ink heads 32y to 32k are inkjet heads that respectively discharge an ink droplet of colored ink of a color different from each other. The colored ink head 32y can discharge an ink droplet of a yellow ultraviolet curing type ink. The colored ink head 32m can discharge an ink droplet of a magenta ultraviolet curing type ink. The colored ink head 32c can discharge an ink droplet of a cyan ultraviolet curing type ink. The colored ink head 32k can discharge an ink droplet of a black ultraviolet curing type ink. The white ink head 36 is an inkjet head that discharges an ink droplet of a white ultraviolet curing type ink.

The clear ink head 38 is an inkjet head that discharges an ink droplet of the ultraviolet curing type clear ink. The clear ink is an ink of clear color, or a transparent color, and is a colorless transparent ink. The clear ink is an ink that contains the ultraviolet curing type resin, and that does not contain a coloring agent.

The shaping material head 34 is an inkjet heat that discharges an ink droplet of the ultraviolet curing type ink used as a shaping material having fluidity for forming the three-dimensional object 5. The shaping material head 34 can discharge the ink droplet of a shaping ink (MO) of a predetermined color. As the shaping ink, for example, white ink, clear ink, or the like may be used.

The support material head 40 is an inkjet head that discharges the ink droplet containing the support material of the support 6 (see FIG. 1). As the support material in this case, a water-soluble material that can be dissolved in water after the shaping of the three-dimensional object 5 is preferably used. A known material for the support 6 may be appropriately used for the support material. The support material head 40 is arranged in a line in the main scanning direction with the position in the sub-scanning direction aligned with respect to the colored ink heads 32y to 32k, the white ink head 36, the clear ink head 38, and the shaping material head 34.

A known inkjet head, for example, can be suitably used for the colored ink heads 32y to 32k, the white ink head 36, the clear ink head 38, the shaping material head 34, and the support material head 40. Such inkjet heads have a nozzle row in which a plurality of nozzles are lined in the sub-scanning direction on a surface facing the shaping table 16 (see FIG. 1). In this case, the lined directions of the nozzle rows in the respective inkjet heads are the same and are parallel to each other. At the time of the main scanning operation, each of the inkjet heads discharges the ink droplet in the Z direction while moving in the main scanning direction orthogonal to the direction in which the nozzles are lined.

The plurality of ultraviolet light sources 44 are light sources of an ultraviolet ray for curing the ultraviolet curing type ink, and an ultraviolet LED (Light Emitting Diode), a metal halide lamp, a mercury lamp, and the like can be used. Each of the plurality of ultraviolet light sources 44 are arranged on one end side and the other end side in the main scanning direction of the discharging unit 12 so as to have the colored ink heads 32y to 32k, the while ink head 36, the clear ink head 38, the shaping material head 34, and the support material head 40 in between. In the three-dimensional object shaping device 10 of the present embodiment, UV1 and UV2 are arranged as the ultraviolet light source 44, where the UV1 is arranged on one end side of the discharging unit 12 in the main scanning direction (Y direction), and the UV2 is arranged on the other end side of the discharging unit 12 in the main scanning direction (Y direction).

The flattening roller unit 50 has a configuration for flattening the layer of ultraviolet curing type ink formed during the shaping of the three-dimensional object 5. The flattening roller unit 50 is arranged between the arrangement of the colored ink heads 32y to 32k, the white ink head 36, the clear ink head 38, the shaping material head 34, and the support material head 40, and the UV2, or the ultraviolet light source 44 arranged on the other end side of the discharging unit 12. Thus, the flattening roller unit 50 is arranged in a line in the main scanning direction with the position in the sub-scanning direction aligned with respect to the arrangement of the colored ink heads 32y to 32k, the white ink head 36, the clear ink head 38, the shaping material head 34, and the support material head 40. The flattening roller unit 50 is arranged on the discharging unit 12 so as to be movable in the up and down direction with respect to the discharging unit 12. The flattening roller unit 50 includes a freely rotatable roller portion 51 that moves in the main scanning direction (Y direction in the figure) with the carriage 22 to scrape off extra shaping material of the shaping material in the flowable state, and an extra shaping material collecting mechanism 52 (see FIG. 1) for collecting the extra shaping material scraped off by the roller portion 51.

Figure 3:
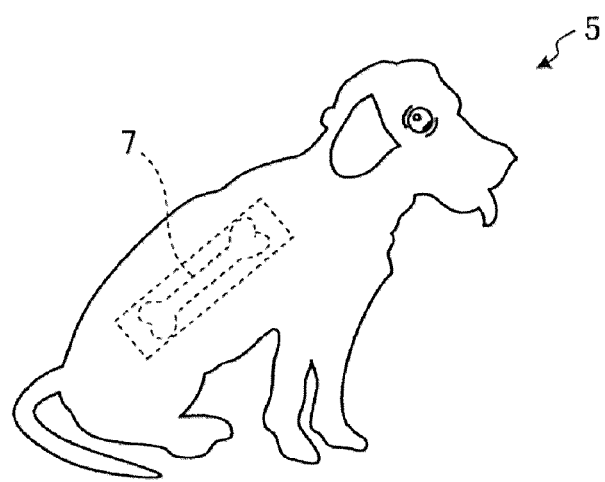
FIG. 3 is a perspective view showing one example of the three-dimensional object manufactured by the manufacturing method for a three-dimensional object according to the embodiment.

Next, a manufacturing method for a three-dimensional object according to the embodiment using the three-dimensional object shaping device 10 will be described. FIG. 3 is a perspective view showing one example of the three-dimensional object 5 manufactured in the manufacturing method for a three-dimensional object according to the embodiment. In the present embodiment, the three-dimensional object 5 is a pet type doll in which a pet is used as a model and the outer appearance of the pet is imitated, as shown in FIG. 3. The three-dimensional object 5 can accommodate an incorporated object 7. In the present embodiment, the remains of the pet are assumed as the incorporated object 7 by way of example. The incorporated object 7 is not limited to the remains, and for example, may be any object such as mortuary tablet, Buddhist scriptures, hair and the like. The added value of the three-dimensional object 5 can be enhanced by accommodating a unique incorporated object 7 associated with the three-dimensional object 5. The three-dimensional object 5 may not have the pet as the model, and may not be the pet type doll. The three-dimensional object 5 may, for example, be a model, and the like having humans, vehicles, buildings, foods and drinks, and the like as the model.

Figure 4:
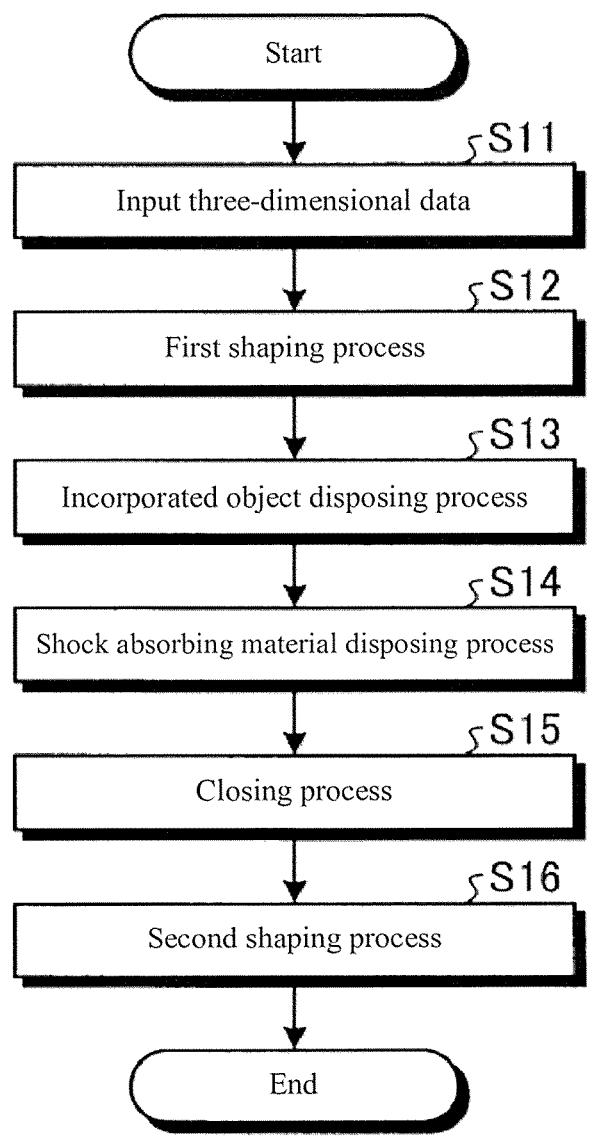
FIG. 4 is a flowchart showing a processing procedure of the manufacturing method for a three-dimensional object according to the embodiment.
Figure 5:
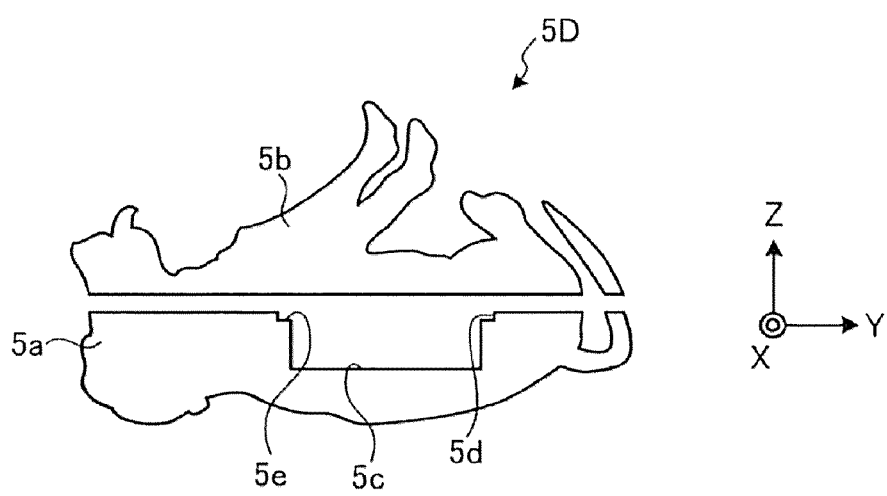
FIG. 5 is an explanatory view showing one example of three-dimensional data of the three-dimensional object.

FIG. 4 is a flowchart showing processes of the manufacturing method for a three-dimensional object according to the first embodiment. Upon manufacturing the three-dimensional object 5, first, in step S11, three-dimensional data 5D of the three-dimensional object 5 is input to the control unit 18 of the three-dimensional object shaping device 10 from an external device such as a personal computer (not shown), and the like. FIG. 5 shows one example of the three-dimensional data 5D of the three-dimensional object 5. In FIG. 5, a cross-sectional view of the three-dimensional data 5D is shown. The three-dimensional data 5D of the three-dimensional object 5 is generated as data having an outer surface shape similar to a pet by analyzing a photograph, and the like of the pet to become the model with the external device (not shown) in advance.

The three-dimensional data 5D of the three-dimensional object 5 is generated as data sectionalizing a first shaping portion 5a located at a lower part at the time of shaping by the three-dimensional object shaping device 10, and a second shaping portion 5b located at an upper part at the time of shaping. The first shaping portion 5a includes a recess 5c opened in a layering direction (Z direction) of the shaping material by the three-dimensional object shaping device 10 indicated with a solid line arrow in FIG. 5. In other words, the recess 5c has an open end 5d at a boundary position of the first shaping portion 5a and the second shaping portion 5b. The recess 5c becomes an internal cavity for disposing the incorporated object 7 in the three-dimensional object 5. In the present embodiment, the open end 5d of the recess 5c includes a step 5e formed along an edge. When shaping the first shaping portion 5a and the second shaping portion 5b while forming the recess 5c, such three-dimensional data 5D of the three-dimensional object 5 is computed and generated in the external device (not shown) such that the forming position of the recess 5c, the layering direction of the shaping material, the boundary position of the first shaping portion 5a and the second shaping portion 5b, and the like become optimum conditions in view of the strength, and the like after the shaping of the three-dimensional object 5.

Figure 6:
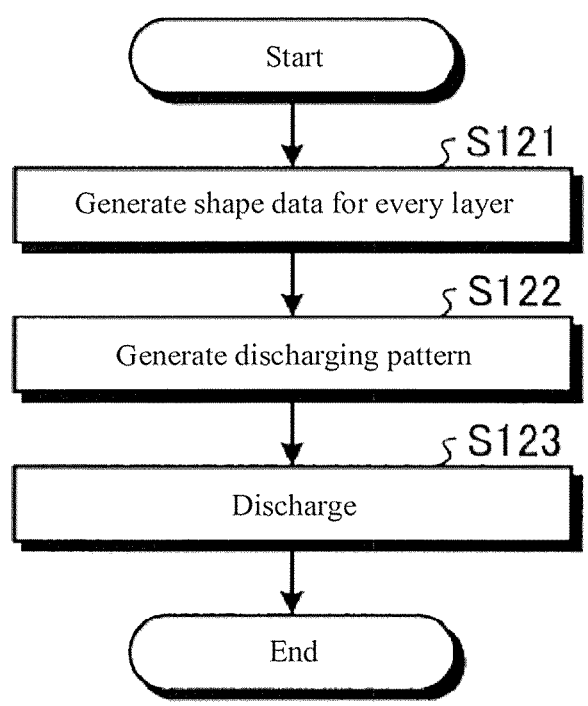
FIG. 6 is a flowchart showing a processing procedure of a first shaping process.

Next, in step S12, a first shaping process of shaping the first shaping portion 5a of the three-dimensional object 5 is executed using the three-dimensional object shaping device 10. FIG. 6 is a flowchart showing a processing procedure of the first shaping process. The processing procedure shown in FIG. 6 is executed by the control unit 18 of the three-dimensional object shaping device 10. In the following description, the description on the support 6 will be omitted, but the support 6 merely needs to be shaped so as to be able to support the three-dimensional object 5 being shaped from the outer side when shaping the three-dimensional object 5 with the three-dimensional object shaping device 10.

First, in step S121, the control unit 18 generates shape data for every layer LY (see FIG. 7) having a predetermined thickness along the layering direction of the shaping material of the first shaping portion 5a based on the three-dimensional data 5D input from the external device, and proceeds to step S122. The control unit 18 calculates an optimum number for the layering number of layers LY in view of the strength, and the like after the shaping of the three-dimensional object 5. The layer LY may be sectionalized when generating the three-dimensional data 5D.

In step S122, the control unit 18 executes a discharging pattern generation process of generating print pattern for every layer LY of the three-dimensional object 5 based on the shape data for every layer LY of the first shaping portion 5a, and generating a discharge control amount, an exposure control amount, a control amount of the main scanning driving unit 14, the shaping table 16, the flattening roller unit 50, and the like that can realize the generated print pattern.

Figure 7:
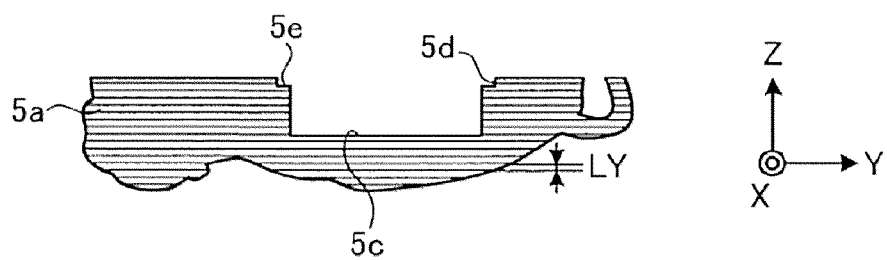
FIG. 7 is an explanatory view showing the three-dimensional object in which a first shaping portion is shaped by the first shaping process.

Next, in step S123, the control unit 18 executes a discharging process of controlling the discharging unit 12, the main scanning driving unit 14, the shaping table 16, and the flattening roller unit 50 according to the discharging pattern generated in step S122. FIG. 7 is an explanatory view showing the first shaping portion 5a shaped by the first shaping process. As shown in the figure, the control unit 18 shapes the first shaping portion 5a while repeating the processes of forming each layer LY in the layering direction (Z direction) of the shaping material by discharging the ink droplet from each inkjet head of the discharging unit 12, flattening each layer LY with the flattening roller unit 50, and curing the discharged ink droplet in each flattened layer LY.

Specifically, when discharging the ink droplet from each inkjet head of the discharging unit 12, the control unit 18 controls the main scanning driving unit 14 to move the carriage 22 along the guide rail 24 in the main scanning direction (Y direction), thus causing the discharging unit 12 to discharge while moving in the main scanning direction. Each inkjet head has a nozzle row in which a plurality of nozzles are lined in the sub-scanning direction, and thus the ink droplet is discharged to a position where the ink droplet is to be discharged in the main scanning direction and the sub-scanning direction by discharging the ink droplet from the nozzle located at the position in the sub-scanning direction defined in the discharging pattern at the position in the main scanning direction defined in the generated discharging pattern while moving the discharging unit 12.

In the discharging unit 12, each layer LY is formed by the discharged ink while discharging the ink droplet from every inkjet head in such manner, but the amount of ink droplet discharged from each nozzle of the inkjet head has a variation of about 10%. Thus, in the discharging unit 12, the amount of ink droplet discharged from each nozzle is discharged by an increase of 10% or more, and the ink before curing is scraped off with the flattening roller unit 50 to flatten the thickness of one layer to a desired thickness. The extra shaping material scraped off by the roller portion 51 is collected by an extra shaping material collecting mechanism 52.

The control unit 18 cures the shaping material by irradiating the shaping material having the desired thickness after the extra shaping material is scraped off with the roller portion 51 with the ultraviolet ray from the ultraviolet light source 44. After one layer is formed in such manner, the shaping table 16 is moved in the Z direction by the thickness of one layer in a direction in which the shaping table 16 moves away from the discharging unit 12, and a next layer is formed so as to overlap the cured layer in the Z direction. The three-dimensional object shaping device 10 repeats such discharging processes to shape the first shaping portion 5a including the recess 5c and the step 5e formed at the edge of the open end 5d of the recess 5c. After the shaping of the first shaping portion 5a is completed in step S123, the control unit 18 terminates the present process, and stops the shaping process of the three-dimensional object 5 by the three-dimensional object shaping device 10.

Figure 8:
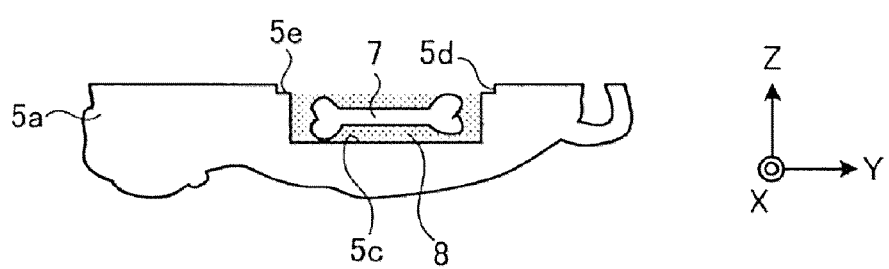
FIG. 8 is an explanatory view showing a state in which an incorporated object is disposed in a recess of the first shaping portion.

The description returns to the processing procedure of the manufacturing method for a three-dimensional object shown in FIG. 4. After the first shaping process is finished, an incorporated object disposing process of disposing the incorporated object 7 in the recess 5c of the first shaping portion 5a is executed in step S13. FIG. 8 is an explanatory view showing a state in which the incorporated object 7 is disposed in the recess 5c. The incorporated object disposing process is carried out by inserting the incorporated object 7 in the recess 5c manually by an operator, or with a robot arm or the like with the first shaping portion 5a shaped in the first shaping process remained mounted on the shaping table 16.

Next, in step S14, a shock absorbing material disposing process of disposing a shock absorbing material 8 at a periphery of the incorporated object 7 in the recess 5c is executed. Similar to the incorporated object disposing process, the shock absorbing material disposing process is carried out by laying the shock absorbing material 8 at the periphery of the incorporated object 7 in the recess 5c manually by the operator, or with the robot arm or the like with the first shaping portion 5a remained mounted on the shaping table 16 (see FIG. 8). A material such as foamed aluminum and urethane foam, for example, is used for the shock absorbing material 8. Movement of the incorporated object 7 thus can be suppressed in the recess 5c, so that breakage and sound generation that occur when the incorporated object 7 impacts the inner wall of the recess 5c can be suppressed.

Figure 9:
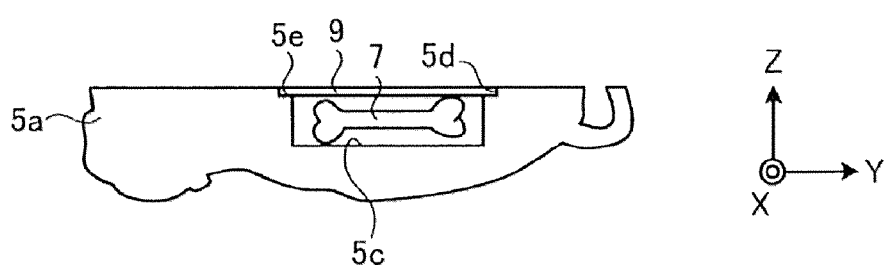
FIG. 9 is an explanatory view showing the first shaping portion in a state in which an open end of the recess is closed by a lid member.

Next, in step S15, a closing process of closing the open end 5d of the recess 5c is executed. FIG. 9 is an explanatory view showing the first shaping portion 5a in a state in which the open end 5d of the recess 5c is closed by the closing process. The closing process is carried out by placing a lid member 9 for closing the open end 5d of the recess 5c on the step 5e of the first shaping portion 5a manually by the operator, or with the robot arm or the like. The lid member 9 is, for example, a member formed in advance using the shaping material and the support material, or other materials having high joining property with the shaping material. As shown in FIG. 9, the lid member 9 is formed in advance so as to fit into the step 5e formed at the edge of the open end 5d of the recess 5c. The open end 5d of the recess 5c thus can be easily closed, and the lid member 9 can be stably placed on the first shaping portion 5a. Furthermore, the ultimately shaped three-dimensional object 5 can be satisfactorily reinforced with the lid member 9. Moreover, in the present embodiment, the lid member 9 has the same thickness as the height of the step 5e in the layering direction of the shaping material. As a result, as shown in FIG. 9, a surface on a side opposite the recess 5c of the lid member 9, which is a portion closing the open end d of the recess 5c, and a portion other than the recess 5c at an uppermost part of the first shaping portion 5a are extended flatly in a direction orthogonal to the layering direction of the shaping material.

Figure 10:
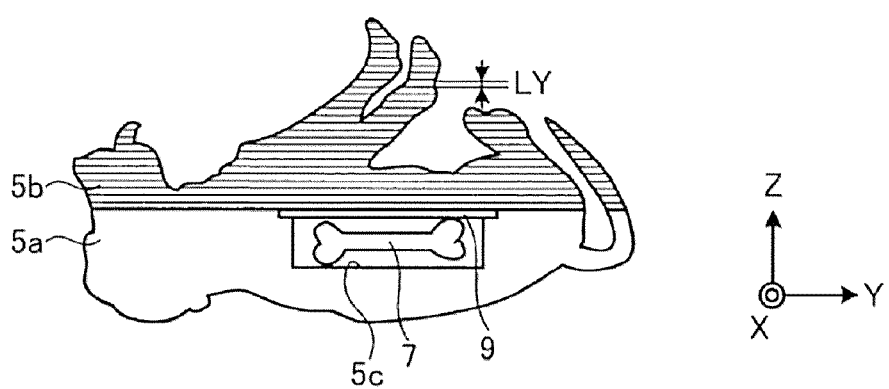
FIG. 10 is an explanatory view showing the three-dimensional object in which a second shaping portion is shaped on the first shaping portion by a second shaping process.

After closing the open end 5d of the recess 5c with the lid member 9, a second shaping process of layering the shaping material on the first shaping portion 5a with the three-dimensional object shaping device 10 to form the second shaping portion 5b is executed in step S16. The second shaping process is executed by the control unit 18. The processing procedure of the second shaping process is similar to the processing procedure of the first shaping process shown in FIG. 6, and thus detailed description will be omitted. FIG. 10 is an explanatory view showing the three-dimensional object 5 in which the second shaping portion 5b is shaped. In the second shaping process, the second shaping portion 5b is shaped by repeating the processes of forming each layer LY in the layering direction (Z direction) of the shaping material by discharging the ink droplet from each inkjet head of the discharging unit 12, flattening each layer LY with the flattening roller unit 50, and curing the discharged ink droplet in each flattened layer LY.

As described above, in the present embodiment, the surface on the side opposite the recess 5c of the lid member 9 and the portion other than the recess 5c at the uppermost part of the first shaping portion 5a are extended flatly. As a result, at an initial stage of the second shaping process, when newly layering a shaping material on the first shaping portion 5a and flattening the layered shaping material with the flattening roller unit 50, hindrance of the operation of the roller portion 51 of the flattening roller unit 50 can be suppressed at the periphery of the lid member 9. The surface on the side opposite the recess 5c of the lid member 9 may be located closer to the recess 5c side than the portion other than the recess 5c at the uppermost part of the first shaping portion 5a.

After the second shaping process is finished, the manufacturing of the three-dimensional object 5 is completed and hence the processing procedure shown in FIG. 4 is terminated. Thus, in the processing procedure shown in FIG. 4, by closing the open end 5d of the recess 5c of the first shaping portion 5a, where the incorporated object 7 is disposed, with the lid member 9 in the closing process of step S15, the shaping material can again be layered on the first shaping portion 5a without layering the shaping material in the recess 5c to shape the second shaping portion 5b in the second shaping process of step S16. As a result, the recess 5c becomes the internal cavity where the incorporated object 7 of the three-dimensional object 5 is disposed.

To shape the three-dimensional object including the internal cavity using the three-dimensional object shaping device (three-dimensional printer) as in the present embodiment, for example, a method of forming a region where a material different from the shaping material such as the support material and the like is layered during the shaping of the three-dimensional object, and after the shaping of the three-dimensional object is completed, removing the material different from the shaping material from the interior of the three-dimensional object through an opening formed on an outer surface of the three-dimensional object may be adopted. In this method, a process of forming the opening on the outer surface of the three-dimensional object and a process of removing the material different from the shaping material from the interior of the three-dimensional object become necessary. Such processes are generally carried out in a device different from the three-dimensional object shaping device, and the processes until manufacturing the three-dimensional object including the interior cavity become cumbersome.

In the manufacturing method for a three-dimensional object according to the present embodiment, the manufacturing of the three-dimensional object 5 including the internal cavity accommodating the incorporated object 7 can be completed without moving the three-dimensional object 5 being manufactured from the shaping table 16 of the three-dimensional object shaping device 10 to another device. Furthermore, the three-dimensional object 5 including the internal cavity can be manufactured without executing the process of forming the opening on the outer surface of the three-dimensional object 5, which shaping is completed, the process of removing the material different from the shaping material from the interior of the three-dimensional object, and the like. As a result, the three-dimensional object 5 including the internal cavity and accommodating the incorporated object 7 in the internal cavity can be more efficiently manufactured. Furthermore, since the opening does not need to be formed on the outer surface of the three-dimensional object 5, the outer appearance of the three-dimensional object 5 can be improved, and the durability of the three-dimensional object 5 can be enhanced.

As described above, the manufacturing method for a three-dimensional object according to the embodiment can provide the internal cavity in the three-dimensional object 5 without removing the support material from the interior of the three-dimensional object 5 or providing a hole for removing the support material in the three-dimensional object 5. Therefore, according to the manufacturing method for a three-dimensional object of the embodiment, the three-dimensional object 5 shaped by layering the shaping material with the three-dimensional object shaping device (three-dimensional printer) 10 can be more efficiently manufactured.

The closing process (step S15) includes a process of placing the lid member 9 for closing the open end 5*d* of the recess 5*c* on the first shaping portion 5*a*. Thus, the open end 5*e* of the recess 5*c* can be easily closed by simply placing the lid member 9 on the first shaping portion 5*a*, and hence the three-dimensional object 5 can be more efficiently manufactured. The lid member 9 may be fixed to the first shaping portion 5*a* by being adhered to the first shaping portion 5*a*, and the like. The three-dimensional object shaping device 10 may be provided with a function of placing the lid member 9 on the step 5*e* of the first shaping portion 5*a*. The material of the lid member 9 may be a plate of metal, resin, and the like, where a stainless thin plate is preferable from the standpoint of strength, flatness, adhesiveness, anti-rust property, and the like.

The first shaping process (step S12) includes a process of forming the step 5*e*, on which the lid member 9 can be placed, at the edge of the open end 5*d* of the recess 5*c*. Thus, the lid member 9 can be easily and stably placed on the first shaping portion 5*a*, whereby the three-dimensional object 5 can be more efficiently manufactured. If the lid member 9 can be stably installed in the first shaping portion 5*a* by fitting the lid member 9 into the open end 5*d* of the recess 5*c*, or adhering and fixing the lid member 9 to the open end 5*d*, the step 5*e* may be omitted from the first shaping portion 5*a*.

The incorporated object disposing process (step S13) of disposing the incorporated object 7 in the recess 5*c* of the first shaping portion 5*a* is further provided, where the incorporated object disposing process is carried out between the first shaping process (step S12) and the closing process (step S15). The incorporated object 7 thus can be easily disposed in the three-dimensional object 5, so that the three-dimensional object 5 whose added value is increased by accommodating the unique incorporated object 7 associated with the three-dimensional object 5 can be more efficiently manufactured. The three-dimensional object 5 may shape the periphery of the recess 5*c* for disposing the incorporated object 7 with a transparent material. For example, if the three-dimensional object 5 is a trophy, a golf ball, and the like used in a tournament related to the trophy is incorporated in the three-dimensional object 5, and a pattern of shaping the periphery of the recess 5*c* of the three-dimensional object 5 with a transparent material, and the like so that the incorporated golf ball can be seen is considered. The three-dimensional object shaping device 10 may be provided with a function of inserting the incorporated object 7 in the recess 5*c*. The incorporated object disposing process may be omitted. In other words, the three-dimensional object manufactured by the manufacturing method for a three-dimensional object according to the embodiment may not necessarily accommodate the incorporated object. In this case as well, according to the manufacturing method for a three-dimensional object of the embodiment, a three-dimensional object including an internal cavity can be more efficiently manufactured, and reduction in weight and reduction in material cost of the three-dimensional object can be easily achieved.

The shock absorbing material disposing process (step S14) of disposing the shock absorbing material 8 at the periphery of the incorporated object 7 in the recess 5*c* is further provided, where the shock absorbing material disposing process is carried out between the incorporated object disposing process (step S13) and the closing process (step S15). Thus, movement of the incorporated object 7 can be suppressed inside the three-dimensional object 5, so that breakage and sound generation that occur when the incorporated object 7 impacts the inner wall of the three-dimensional object 5 can be suppressed. A function of disposing the shock absorbing material 8 at the periphery of the incorporated object 7 of the recess 5*c* may be provided. The shock absorbing material disposing process may be omitted.

The portion closing the open end 5*d* of the recess 5*c* is extended flatly with the portion other than the recess 5*c* at the uppermost part of the first shaping portion 5*a*. Thus, the second shaping portion 5*b* can be easily shaped with the three-dimensional object shaping device 10 on the first shaping portion 5*a*, which open end 5*d* of the recess 5*c* is closed. In the second shaping process, as long as the operation of the roller portion 51 of the flattening roller unit 50 is not inhibited, the portion closing the open end 5*d* of the recess 5*c* and the portion other than the recess 5*c* at the uppermost part of the first shaping portion 5*a* may not be flatly formed.

In the present embodiment, in the closing process (step S15), the lid member 9 for closing the open end 5*d* of the recess 5*c* is placed on the first shaping portion 5*a*, but the process of closing the open end 5*d* of the recess 5*c* is not limited thereto. The closing process may be, for example, a process of layering a filling material with the three-dimensional object shaping device 10 in the recess 5*c* where the incorporated object 7 is disposed to close the open end 5*d* of the recess 5*c*, after executing the incorporated object disposing process of step S13, in the processing procedure shown in FIG. 4. In this case, it is assumed that the incorporated object 7 is disposed in the recess 5*c* of the first shaping portion 5*a*. As the filling material, the shaping material may be used, the support material may be used, or a material having high joining property with the shaping material may be used. In this case, the lid member 9 does not need to be placed on the first shaping portion 5*a*, and hence the step 5*e* does not need to be formed at the edge of the open end 5*d* of the recess 5*c* in the first shaping process. Furthermore, since the filling material is filled in the recess 5*c* at the periphery of the incorporated object 7 in this case, the shock absorbing material disposing process of step S14 is omitted.

Figure 11:
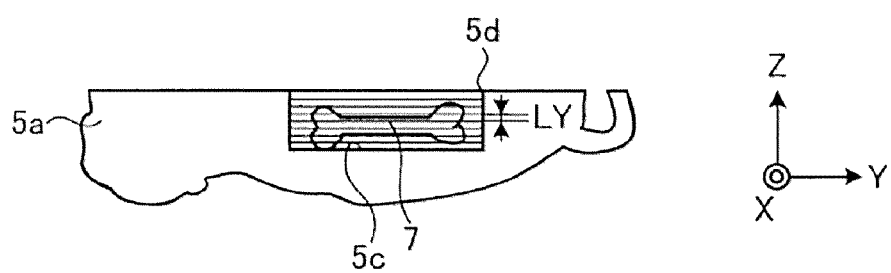
FIG. 11 is an explanatory view showing the first shaping portion in a state in which a filling material is layered with the three-dimensional object shaping device in the recess where the incorporated object is disposed.

FIG. 11 is an explanatory view showing the first shaping portion 5*a* in a state in which the filling material is layered with the three-dimensional object shaping device 10 in the recess 5*c* where the incorporated object 7 is disposed. Such process of layering the filling material in the recess 5*c* by the three-dimensional object shaping device 10 is executed by the control unit 18. The process of layering the filling material in the recess 5*c* is basically similar to the process of the first shaping process shown in FIG. 6. In other words, the control unit 18 generates the shape data for every layer LY of the recess 5*c* based on the three-dimensional data 5D of the first shaping portion 5*a* in step S121 shown in FIG. 6, generates the discharging pattern for every layer LY shown in FIG. 11 based on the shape data in step S122, and controls the discharging unit 12, the main scanning driving unit 14, the shaping table 16, and the flattening roller unit 50 according to the discharging pattern in step S123. In the present process, the flattening process by the flattening roller unit 50 merely needs to be carried out only on the last layer LY in the recess 5*c*. Thus, the portion closing the open end 5*d* of the recess 5*c* and the portion other than the recess 5*c* of the first shaping portion 5*a* can be flatly extended.

Figure 12:
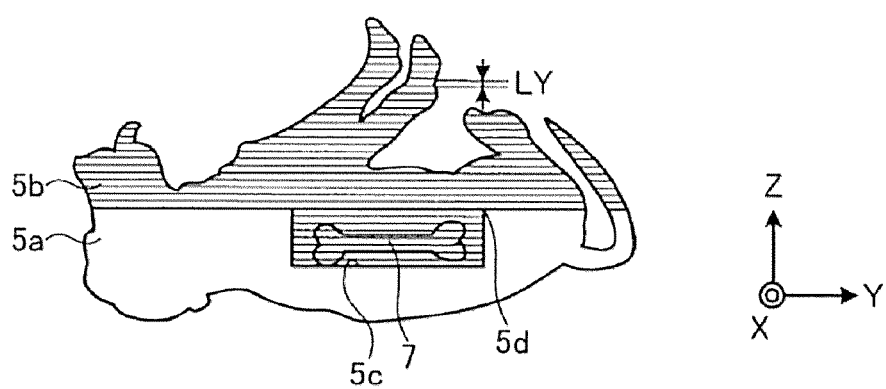
FIG. 12 is an explanatory view showing the three-dimensional object in which a second shaping portion is shaped on the first shaping portion, which open end of the recess is closed, shown in FIG. 11.

FIG. 12 is an explanatory view showing the three-dimensional object 5 in which the second shaping process is carried out to shape the second shaping portion 5b on the first shaping portion 5a shown in FIG. 11. As shown in the figure, the second shaping process of layering the shaping material again with the three-dimensional object shaping device 10 on the first shaping portion 5a, which open end 5d is closed, to shape the second shaping portion 5b can be executed by layering the filling material in the recess 5c by the three-dimensional object shaping device 10 up to the position of closing the open end 5d of the recess 5c in the closing process. Furthermore, by flatly extending the portion closing the open end 5d of the recess 5c and the portion other than the recess 5c of the first shaping portion 5a in the closing process, hindrance of the operation of the roller portion 51 of the flattening roller unit 50 can be suppressed when newly layering the shaping material on the first shaping portion 5a and flattening the layered shaping material with the flattening roller unit 50 at the initial stage of the second shaping process. When forming the recess 5c in the first shaping portion 5a assuming that the incorporated object 7 will be disposed inside the three-dimensional object 5, the filling material in the recess 5c does not need to be removed as long as the incorporated object 7 can be disposed. As a result, the three-dimensional object 5 accommodating the incorporated object 7 can be more efficiently manufactured.

Second Embodiment

Figure 13:
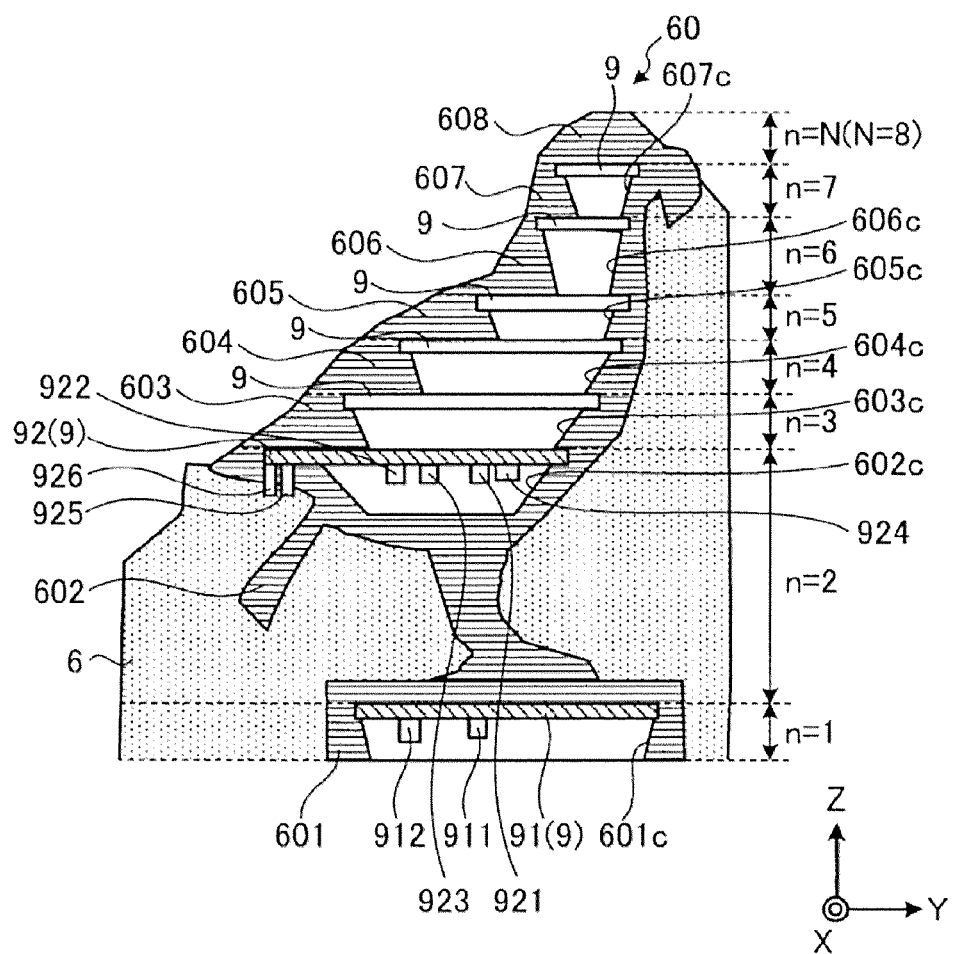
FIG. 13 is a cross-sectional view showing one example of a three-dimensional object manufactured in a manufacturing method for a three-dimensional object according to a second embodiment.

Now, a manufacturing method for a three-dimensional object according to a second embodiment will be described. In the second embodiment, the three-dimensional object shaping device 10, similar to the first embodiment, is used to manufacture a three-dimensional object. FIG. 13 is a cross-sectional view showing one example of a three-dimensional object 60 manufactured in the manufacturing method for a three-dimensional object according to the second embodiment. In the present embodiment, the three-dimensional object 60 is a pet type doll in which a pet is used as a model and the outer appearance of the pet is imitated, similar to the first embodiment. The three-dimensional object 60 may not have a pet as a model, and may not be a pet type doll. The three-dimensional object 60 may, for example, be a model, and the like having humans, vehicles, buildings, foods and drinks, and the like as the model.

In the first embodiment, the three-dimensional object 5 is obtained by layering the shaping material with the three-dimensional object shaping device 10 in two shaping processes for the first shaping portion 5a and the second shaping portion 5b, but in the second embodiment, the three-dimensional object 60 is obtained by layering the shaping material with the three-dimensional object shaping device 10 in n shaping processes for the first shaping portion to the $n^{th}$ shaping portion. In other words, the three-dimensional object 60 has the shaping material layered by the three-dimensional object shaping device 10 for every n (n=1, 2, ... N) $n^{th}$ shaping portions 60n, as shown marked out with a broken line in FIG. 13. In the present embodiment, N=8.

Figure 14:
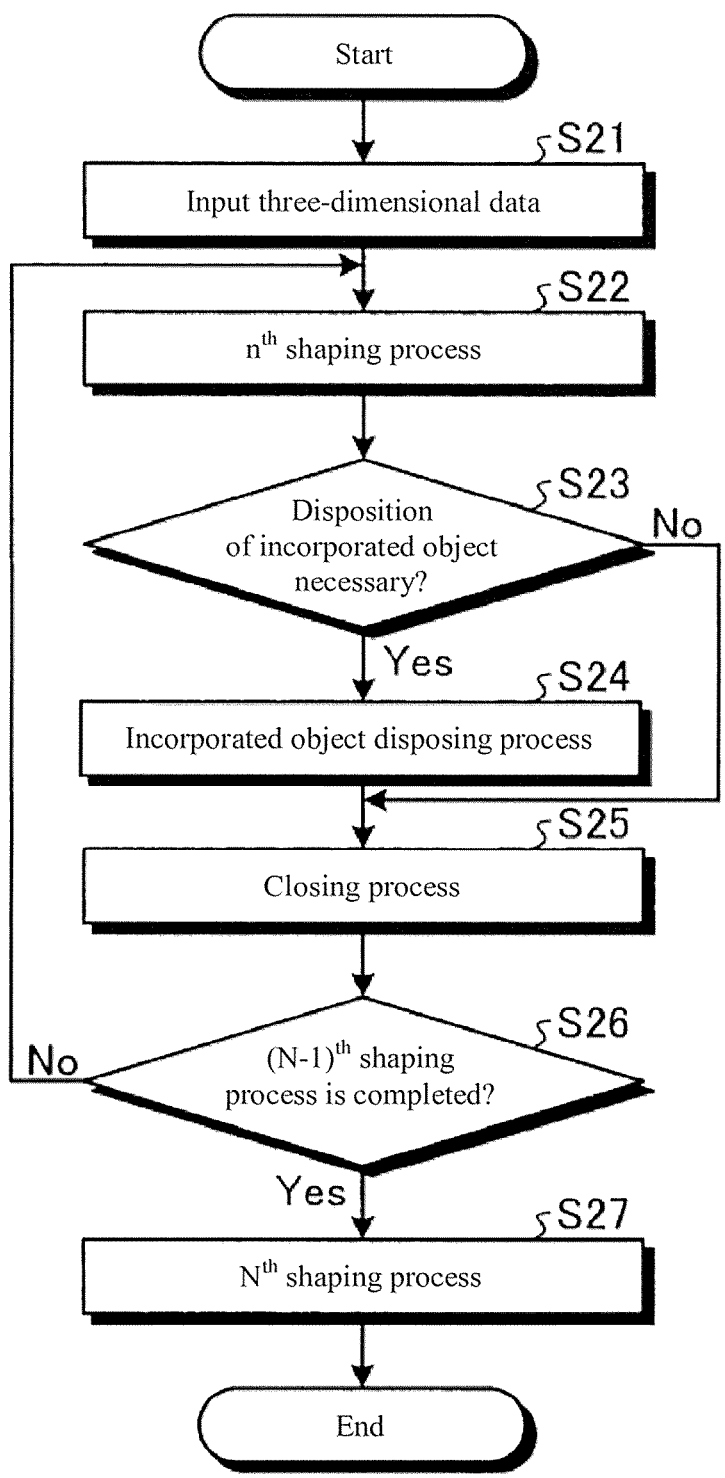
FIG. 14 is a flowchart showing a processing procedure of the manufacturing method for a three-dimensional object according to the second embodiment.

FIG. 14 is a flowchart showing processes of the manufacturing method for a three-dimensional object according to the second embodiment. Upon manufacturing the three-dimensional object 60, first, in step S21, three-dimensional data of the three-dimensional object 60 is input to the control unit 18 of the three-dimensional object shaping device 10 from an external device such as a personal computer (not shown), and the like.

The three-dimensional data of the three-dimensional object 60 is generated as data sectionalized to first shaping portion 601 to eighth shaping portion 608 sequentially layered from a lower part toward an upper part at the time of shaping by the three-dimensional object shaping device 10. The first shaping portion 601 to the seventh shaping portion 607 each have a recess opened in the layering direction (Z direction) of the shaping material by the three-dimensional object shaping device 10. In the present embodiment, the recess of the $n^{th}$ shaping portion 60n is assumed as an $n^{th}$ recess 60nc. For example, the first shaping portion 601 includes a first recess 601c, and the second shaping portion 602 includes a second recess 602c. In the present embodiment, the $n^{th}$ recess 60nc is formed so as to widen from a bottom surface toward the open end. In other words, the side surface of the $n^{th}$ recess 60nc is an inclined surface extending to form an angle of greater than or equal to 90 degrees with respect to the bottom surface so as not to overhang. Thus, the shaping material can be prevented from collapsing when layering the shaping material at the periphery of the $n^{th}$ recess 60nc. Although not shown, the open end of each $n^{th}$ recess 60nc includes a step formed along the edge, similar to the recess 5c of the first embodiment.

Next, in step S22, an $n^{th}$ shaping process of shaping the $n^{th}$ shaping portion 60n of the three-dimensional object 60 is executed using the three-dimensional object shaping device 10. The processing procedure of the $n^{th}$ shaping process is basically similar to the process of step S12 shown in FIG. 4, and hence detailed description thereof will be omitted. In the process of step S22, the control unit 18 of the three-dimensional object shaping device 10 records the number of times that the shaping process was carried out. The control unit 18 shapes n+1$^{th}$ shaping portion 60n+1 when executing the process of step S22 the next time.

After the n shaping process of step S22 is completed and the shaping process by the three-dimensional object shaping device 10 is once stopped, whether or not the disposition of the incorporated object inside the $n^{th}$ recess 60nc of the $n^{th}$ shaping portion 60n shaped in step S22 is necessary is determined in step S23. The determination of step S23 may be carried out by the determination of an operator when the disposition of the incorporated object is carried out manually by the operator, and may be carried out by the control unit 18 when the disposition of the incorporated object is automatically carried out by, for example, a robot arm, and the like.

When determined that the disposition of the incorporated object inside the $n^{th}$ recess 60nc is necessary (step S23, Yes), the incorporated object disposing process is executed in step S24, and the process proceeds to step S25. The incorporated object disposing process of step S24 is similar to the process of step S13 shown in the processing procedure of FIG. 4. When not determined that the disposition of the incorporated object inside the $n^{th}$ recess 60nc is necessary (step S23, No), the incorporated object disposing process of step S24 is omitted and the process proceeds to step S25. In manufacturing the three-dimensional object 60 shown in FIG. 13, it is assumed that the incorporated object is not disposed in any of the $n^{th}$ recesses 60nc. After the incorporated object disposing process of step S24, the shock absorbing material disposing process of step S14 of FIG. 4 may be provided.

In step S25, the closing process of closing the open end of the $n^{th}$ recess 60nc is executed. The process of step S25 is basically similar to the processing procedure of step S15 of FIG. 4. In other words, the lid member 9 for closing the open end of the $n^{th}$ recess 60nc is placed on the step (not shown) of the $n^{th}$ shaping portion 60n manually by the operator, with the robot arm arranged in the three-dimensional object shaping device 10, or the like.

As shown in FIG. 13, an electronic substrate 91 is used for the lid member 9 for closing the open end of the first recess 601c of the first shaping portion 601. An electronic substrate 92 is used for the lid member 9 for closing the open end of the second recess 602c of the second shaping portion 602. As shown in FIG. 13, the electronic substrate 91 has a component arranged on a surface on the first recess 601c side, and the electronic substrate 92 has a component arranged on a surface on the second recess 602c side. Thus, when layering the shaping material on a surface on an opposite side of the first recess 61c of the electronic substrate 91 or on a surface on an opposite side of the second recess 602c of the electronic substrate 92 functioning as the lid member 9, the ink discharging surface of each head (plurality of colored ink heads 32y to 32k, white ink head 36, clear ink head 38, shaping material head 34, support material head 40) of the three-dimensional object shaping device 10 can be prevented from making contact with the component. As a result, the shaping material can be layered on the electronic substrates 91, 92 without any trouble. Thus, the electronic substrates 91, 92 used as the lid member 9 are suitably one side mounting substrates. If there is no possibility of the components of the electronic substrates 91, 92 and each head of the three-dimensional object shaping device 10 coming into contact, the component may be arranged on the surface on the side opposite the first recess 601c of the electronic substrate 91 and the surface on the side opposite the second recess 602c of the electronic substrate 92. The configuration and the function of the electronic substrates 91, 92 will be described later.

Next, in step S26, whether or not the shaping process up to the N−1$^{th}$ shaping portion 60N−1 (in the present embodiment, seventh shaping portion 607) is completed is determined. This determination may be carried out by the control unit 18, or may be carried out by the determination of the operator. When determined that the shaping process up to the N−1$^{th}$ shaping portion N−1 (seventh shaping portion 607) is not completed (step S26, No), the processes after step S22 are again executed. Thus, in step S22, the process of shaping the n+1$^{th}$ shaping portion 60n+1 on the n$^{th}$ shaping portion 60n, which open end of the n$^{th}$ recess 60nc is closed, is executed.

When determined that the shaping process up to the N−1$^{th}$ shaping portion 60N−1 (seventh shaping portion 607) is completed (step S26, Yes), the N$^{th}$ shaping process of shaping the N$^{th}$ shaping portion 60N (eighth shaping portion 608 in the present embodiment) is executed in step S27. The process of step S27 is similar to the process shown in step S16 of FIG. 4, and thus the description thereof will be omitted. When the shaping of the N$^{th}$ shaping portion 60N (eighth shaping portion 608) is finished, the manufacturing of the three-dimensional object 60 is completed, and hence the processing procedure shown in FIG. 14 is terminated. Thus, a plurality of n$^{th}$ recess 60nc can be formed at arbitrary positions inside the three-dimensional object 60 by dividing the three-dimensional object 60 into a plurality of n$^{th}$ shaping portions 60n and manufacturing the same. As a result, further weight reduction of the three-dimensional object 60 can be achieved, and the incorporated object can be disposed in the arbitrary n$^{th}$ recess 60nc.

Figure 15:
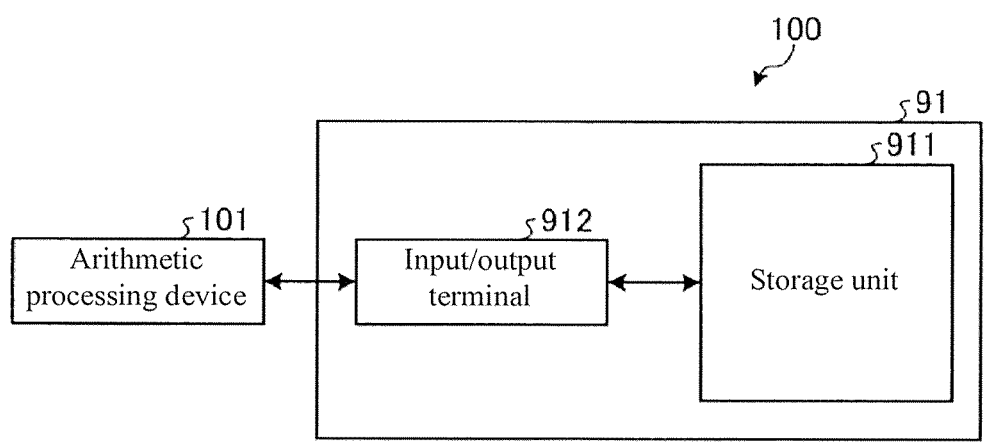
FIG. 15 is a block diagram showing an electronic circuit device.
Figure 16:
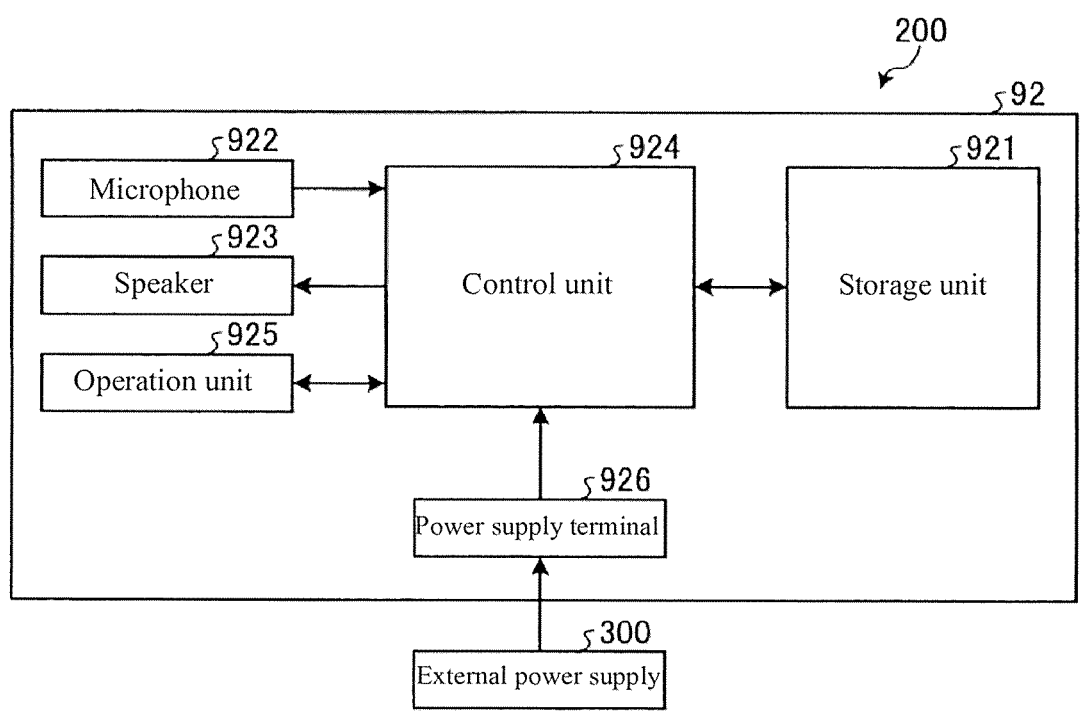
FIG. 16 is a block diagram showing an electronic circuit device.

The three-dimensional object 60 manufactured through the processing procedure described above incorporates the electronic substrate 91 serving as the lid member 9 for closing the first recess 601c of the first shaping portion 601, as described above. The electronic substrate 91 configures one part of an electronic circuit substrate 100 (see FIG. 15). The three-dimensional object 60 incorporates the electronic substrate 92 serving as the lid member 9 for closing the second recess 602c of the second shaping portion 602, as described above. The electronic substrate 92 configures an electronic circuit device 200 (see FIG. 16). In other words, the three-dimensional object 60 incorporates one part of the electronic circuit device 100 and also incorporates the electronic circuit device 200. The electronic circuit device 100 and the electronic circuit device 200 will be hereinafter described in detail. FIG. 15 is a block diagram showing the electronic circuit device 100, and FIG. 16 is a block diagram showing the electronic circuit device 200.

First, the electronic circuit device 100 will be described. As shown in FIG. 15, the electronic circuit device 100 includes the electronic substrate 91 incorporated in the three-dimensional object 60, and an arithmetic processing device 101 being externally connected to the electronic substrate 91 and functioning as an input unit and an output unit of data. The arithmetic processing device 101 is, for example, a personal computer. The arithmetic processing device 101 stores document data, and is able to browse and edit the document data.

As shown in FIG. 13, the electronic substrate 91 includes a storage unit 911 that stores unique data associated with the three-dimensional object 60, and an input/output terminal 912 through which the unique data can be input/output from the arithmetic processing device 101 (see FIG. 15).

In the present embodiment, the storage unit 911 is a RAM (Random Access Memory) mounted on the electronic substrate 91. The storage unit 911 may, for example, be any storage medium as long as data can be stored such as a hard disc drive connected to the electronic substrate 91. If the storage unit 911 cannot be mounted on the electronic substrate 91 such as a hard disc drive, it may be disposed in the first recess 601c in the incorporated object disposing process of step S24, and connected to the electronic substrate 91 in the closing process of step S25.

The input/output terminal 912 is, for example, a USB connectable terminal, and the like, and is connected to the storage unit 911 on the electronic substrate 91. The electronic substrate 91 may include a power supply terminal capable of supplying external power, or a rechargeable battery capable of supplying power to the electronic substrate 91 may be disposed in the first recess 601c in the incorporated object disposing process of step S24 of FIG. 14. Furthermore, a cradle serving both to supply power supply to the electronic substrate 91 and to charge the battery on the electronic substrate 91, and on which the three-dimensional object 60 can be mounted may be separately arranged, and the input/output terminal 912 and the arithmetic processing device 101 may be connected by way of the cradle.

As shown in FIG. 13, the first recess 601c of the present embodiment is opened at the lower side of the three-dimensional object 60. Thus, the arithmetic processing device 101 can be connected to the input/output terminal 912 of the electronic substrate 91 through the opening at the lower side of the three-dimensional object 60 of the first recess 601c. As a result, power can be supplied to the electronic substrate 92 from the arithmetic processing device 101, and unique data can be exchanged between the arithmetic processing device 101 and the storage unit 911 through the input/output terminal 912. The unique data is, for example, document data related to the three-dimensional object 60 such as year, month and date of manufacture of the three-dimensional object 60, name, birthday, and death anniversary of the pet adopted for the model. When the three-dimensional object 60 is a human model (doll), for example, the unique data may be history data of the human adopted for the model. Thus, the three-dimensional object 60 capable of storing the document data unique to the three-dimensional object 60, and capable of browsing and editing the document data with the arithmetic processing device 101 can be easily manufactured.

Now, the electronic circuit device 200 will be described. As shown in FIG. 16, the electronic circuit device 200 is configured by the electronic substrate 92. The electronic substrate 92 includes a storage unit 921 serving as a storage unit for storing unique data associated with the three-dimensional object 60, a microphone 922 serving as an input unit for inputting the unique data, a speaker 923 serving as an output unit for outputting the unique data, a control unit 924 for controlling the electronic circuit device 200, an operation unit 925 that gives an operation instruction, and a power supply terminal 926 connected to an external power supply 300 for supplying power.

In the present embodiment, the storage unit 921 is a RAM (Random Access Memory) mounted on the electronic substrate 91, but may be any storage medium as long as data can be stored, for example, a hard disc drive, and the like connected to the electronic substrate 91. If the storage unit 921 cannot be mounted on the electronic substrate 92 such as the hard disc drive, it may be disposed in the second recess 602*c* in the incorporated object disposing process of step S24, and connected to the electronic substrate 92 in the closing process of step S25.

The microphone 922 collects sound from the exterior of the three-dimensional object 60. Furthermore, the speaker 923 outputs the sound to the exterior of the three-dimensional object 60. In other words, the microphone 922 serving as the input unit and the speaker 923 serving as the output unit are mounted on the electronic substrate 92. In this case, in order to satisfactorily input the sound with the microphone from the exterior of the three-dimensional object 60 and satisfactorily output the sound to the exterior of the three-dimensional object 60, a hole (not shown) passing from the outer surface of the three-dimensional object 60 to the second recess 602*c* is preferably provided.

The control unit 924 is an arithmetic processing unit capable of communicating with the storage unit 921, the microphone 922, the speaker 923, and the operation unit 925, and controls the operations of the microphone 922 and the speaker 923 based on the operation instruction from the operation unit 925. The control unit 924 includes CPU (Central Processing Unit), SoC (System-on-a-Chip), MCU (Micro Control Unit), and FPGA (Field-Programmable Gate Array), but is not limited thereto. When the operation instruction of recording is input from the operation unit 925, the control unit 924 converts the signal of the sound collected with the microphone 922 to sound data, and stores the same in the storage unit 921. When the operation instruction of reproduction is input from the operation unit 925, the control unit 924 converts the sound data stored in the storage unit 921 to a signal of sound, and outputs the same from the speaker 923.

The operation unit 925 is, for example, a switch for issuing a recording instruction of recording sound from the microphone 922, a reproduction instruction of reproducing the recorded sound from the speaker 923, and the like, and is connected to the control unit 924. As shown in FIG. 13, the operation unit 925 is exposed on the outer surface of the second shaping portion 602. As shown in FIG. 13, the power supply terminal 926 is exposed on the outer surface of the three-dimensional object 60. The operation unit 925 and the power supply terminal 926 are exposed on the exterior of the three-dimensional object 60 by forming a hole through which the operation unit 925 and the power supply terminal 926 can be inserted when shaping the second shaping portion 602 in step S22, and inserting the operation unit 925 and the power supply terminal 926 into the hole when closing the open end of the second recess 602*c* with the electronic substrate 92 in the closing process of step S25 in the processing procedure shown in FIG. 14. A cradle on which the three-dimensional object 60 can be mounted may be separately arranged, and the control unit 924 and the operation unit 925 may be arranged inside the cradle with the external power supply 300. Furthermore, the microphone 922 and the speaker 923 may be arranged inside the cradle, or the microphone 922 and the speaker 923 may be arranged on the electronic substrate 92 and the storage unit 921 may be arranged in the cradle.

Thus, the sound collected with the microphone 922 can be stored as sound data in the storage unit 921, and the stored sound data can be reproduced from the speaker 923. In other words, the three-dimensional object 60 can be used as a recording/reproducing device of the sound data. Here, the sound data is, for example, the crying of the pet adopted for the model. The sound data may be a real voice of a human adopted for the model if the three-dimensional object 60 is a model (doll) of a human, an engine sound or a horn sound, or an open/close sound of an automatic door of a car adopted for the model if the three-dimensional object 60 is a model of a car, recording of a conversation of a family living in a house or a room adopted for the model if the three-dimensional object 60 is a model of a house or a room, and the like.

Thus, the three-dimensional object 60 interiorly incorporates one part of the electronic circuit device 100 including the storage unit 911 storing the unique data unique to the three-dimensional object 60, and the electronic circuit device 200 including the storage unit 921 storing the unique data unique to the three-dimensional object 60. Thus, a storage function of the associated specific unique data can be provided to the three-dimensional object 60, and a unique function can be provided to the three-dimensional object by using the unique data in various methods by the input unit and the output unit. As a result, a three-dimensional object 60 having high added value can be more efficiently manufactured.

As described above, according to the manufacturing method for a three-dimensional object of the second embodiment, a three-dimensional object shaped by layering a shaping material with the three-dimensional object shaping device (three-dimensional printer) 10 can be more efficiently manufactured.

In the present embodiment, the electronic substrate 91 is provided as the lid member 9 for closing the first recess 601*c* and the electronic substrate 92 is provided as the lid member 9 for closing the second recess 602*c*, but the electronic substrate may be any lid member 9 for closing the first recess 601*c* to the seventh recess 607*c*.

In the present embodiment, the unique data is assumed as the document data unique to the model of the three-dimensional object 60, and the input unit and the output unit are assumed as the arithmetic processing device 101 capable of browsing and editing the document data; and the unique data is assumed as the sound data unique to the model of the three-dimensional object 60, the input unit is assumed as the microphone 922, and the output unit is assumed as the speaker 923, but the unique data, the input unit and the output unit are not limited thereto.

For example, the unique data may be an image (still image or moving image) in which the model of the three-dimensional object 60 is photographed, or image data photographed at an eye line of the model of the three-dimensional object 60, the input unit may be an imaging element capable of photographing the image (still image or moving image), and the output unit may be a display. In this case, for example, a hole through which a photographing equipment including an imaging element, a lens, and the like can be inserted is provided at a height of the eye line of the three-dimensional object 60, an electronic substrate is disposed at a position connectable to the imaging element through the hole, and the imaging element is connected to the electronic substrate while inserting the photographing equipment including the imaging element, the lens, and the like to the hole after the shaping of the three-dimensional object 60. In the processing procedure of FIG. 14, the photographing equipment including the imaging element, the lens, and the like may be disposed inside the three-dimensional object 60 and inserted through the hole in the incorporated object disposing process of step S24, and the imaging element may be connected to the electronic substrate 92 in the closing process of step S25. Furthermore, an output terminal connectable with the display serving as the output unit may be arranged on the electronic substrate, and the output terminal may be exposed on the outer surface of the three-dimensional object 60 like the operation unit 925 and the power supply terminal 926, so that the output terminal can be connected to the display. This allows the image data photographed with the imaging element to be stored in the storage unit of the electronic substrate, and the stored image data to be reproduced on the display. In other words, the three-dimensional object 60 serving as the recording/reproducing device of the image data can be easily manufactured. The image data is not limited to the image in which the model of the three-dimensional object 60 is photographed or the image of the eye line of the model. For example, an image in which an atmosphere of a tournament related to a trophy or a commemorative plaque is photographed can be adopted when the three-dimensional object 60 is a trophy, a commemorative plaque, and the like; an image in which an atmosphere of a family living in a house or a room serving as the model is photographed can be adopted when the three-dimensional object 60 is a model of a house or a room; and the like.

Furthermore, the unique data may be data created in advance, the input unit may be an arithmetic processing device such as a personal computer, for example, and the output unit may be a motor or a light emitting element such as an LED that operates according to the data, and the like. In this case, the output unit such as the motor or the light emitting element such as the LED is to be incorporated in the three-dimensional object 60 in the incorporated object disposing process of step S24 while being mounted on the electronic substrate 92. Thus, the vibration by the motor can be generated in the three-dimensional object 60 by the data created in advance, light can be emitted from inside the three-dimensional object 60 by the light emitting element such as the LED, and the like.

Various setting is considered for the operation pattern of the output unit. For example, at least a part of the three-dimensional object 60 may be shaped with a transparent material, and a motion sensor such as an infrared sensor may be incorporated in the three-dimensional object 60 in the incorporated object disposing process of step S24, so that the motor or the light emitting element may be operated when a person approaching the vicinity of the three-dimensional object 60 is sensed by the motion sensor. Furthermore, the model of the three-dimensional object 60 may be a lighthouse, the unique data may be data of lighting quality (lighting manner) that can identify the relevant lighthouse, a light sensor may be incorporated in the three-dimensional object 60, and light emission by the light emitting element such as the LED may be carried out when peripheral darkness is detected by the light sensor. In this case, a shutter mechanism for periodically shielding the light emission by the light emitting element such as the LED may be arranged on the outer surface of the three-dimensional object 60, and a drive source such as the motor for driving the shutter mechanism may be incorporated in the three-dimensional object 60 in the incorporated object disposing process of step S24. A drive mechanism for causing the three-dimensional object 60 to travel may be arranged in the first recess 601c of the three-dimensional object 60, and a motor for driving the drive mechanism may be arranged as the output unit. The drive mechanism may be disposed in the first recess 601c in the incorporated object disposing process of step S24.

The connection of the storage unit 911 of the electronic substrate 91 and the storage unit 921 of the electronic substrate 92, and the input unit and the output unit may not be a wired connection. For example, instead of arranging the input/output terminal 912 on the electronic substrate 91, a communication unit enabling wireless communication may be arranged, so that communication can be made with the arithmetic processing device 101 serving as the input unit and the output unit by the wireless communication, and unique data can be exchanged between the storage unit 911 and the arithmetic processing device 101. In this case, any wireless communication standard may be adopted. Furthermore, a rechargeable battery may be mounted on the electronic substrate 91 and the electronic substrate 92, and the power supply for charging may be wirelessly carried out.

The data stored in the storage units 921, 922 of the electronic substrates 91, 92 is not limited to the unique data described above (sound data, image data, document data, etc.). The data stored in the storage units 921, 922 may be an identification number individually given to the three-dimensional object 60. For example, only the identification number may be stored in the storage unit 911 of the electronic substrate 91. An external electronic circuit (e.g., cradle on which the three-dimensional object 60 can be mounted) (not shown) including a storage unit for storing the unique data (sound data, image data, document data, etc.) unique to the three-dimensional object 60 corresponding to the identification number, and a control unit for controlling the input unit and the output unit is separately prepared. The external electronic circuit can input unique data from the input unit and output unique data to the output unit. The input/output terminal 912 of the electronic substrate 91 and the external electronic circuit are then connected, and the identification number is input to the control unit of the external electronic circuit, so that the unique data corresponding to the identification number is output to the output unit. The output unit thus can be used in various applications corresponding to the unique data for every three-dimensional object 60 using one external electronic circuit. In this case, the input unit and the output unit may be either incorporated in the three-dimensional object 60 or externally connected.

What is claimed is:
1. A manufacturing method for a three-dimensional object comprising:
a first shaping process of layering a shaping material with a three-dimensional printer to shape a first shaping portion including a recess opened in a layering direction of the shaping material;

a closing process of closing an open end of the recess of the first shaping portion, wherein the recess is formed so as a side surface of the recess does not overhang while the first shaping portion is shaped in the layering direction; and a second shaping process of layering the shaping material with the three-dimensional printer on the first shaping portion, which open end of the recess is closed, to form a second shaping portion, wherein forming a plurality of layers by repeatedly curing discharged droplets of a curable resin in the layering direction is carried out in the first shaping process.

2. The manufacturing method for a three-dimensional object according to claim 1, wherein a portion closing the open end of the recess is extended flatly with a portion other than the recess at an uppermost part of the first shaping portion.

3. The manufacturing method for a three-dimensional object according to claim 1, wherein the closing process includes a process of placing a lid member for closing the open end of the recess on the first shaping portion.

4. The manufacturing method for a three-dimensional object according to claim 3, wherein the first shaping process includes a process of forming a step, on which the lid member is placeable, at an edge of the open end of the recess.

5. The manufacturing method for a three-dimensional object according to claim 4, further comprising an incorporated object disposing process of disposing an incorporated object in the recess of the first shaping portion, wherein the incorporated object disposing process is carried out between the first shaping process and the closing process.

6. The manufacturing method for a three-dimensional object according to claim 5, further comprising a shock absorbing material disposing process of disposing a shock absorbing material at a periphery of the incorporated object in the recess, wherein the shock absorbing material disposing process is carried out between the incorporated object disposing process and the closing process.

7. The manufacturing method for a three-dimensional object according to claim 1, further comprising an incorporated object disposing process of disposing an incorporated object in the recess of the first shaping portion, wherein the incorporated object disposing process is carried out between the first shaping process and the closing process, and the closing process includes a process of layering a filling material with the three-dimensional printer in the recess where the incorporated object is disposed to close the open end of the recess.

8. The manufacturing method for a three-dimensional object according to claim 3, wherein the lid member is an electronic substrate.

9. The manufacturing method for a three-dimensional object according to claim 8, further comprising an incorporated object disposing process of disposing an incorporated object in the recess of the first shaping portion, wherein the incorporated object disposing process is carried out between the first shaping process and the closing process, and the incorporated object is a component of the electronic substrate.

10. The manufacturing method for a three-dimensional object according to claim 8, wherein the electronic substrate includes at least one of a microphone to which sound data is input, a memory that stores the sound data input to the microphone, and a speaker from which the sound data stored in the memory is output.

11. The manufacturing method for a three-dimensional object according to claim 8, wherein the electronic substrate has a component arranged on a surface on the recess side.

12. The manufacturing method for a three-dimensional object according to claim 5, wherein the incorporated object is a unique incorporated object associated with the three-dimensional object.

13. The manufacturing method for a three-dimensional object according to claim 8, wherein the data is unique data associated with the three-dimensional object.

* * * * *